Aug. 11, 1953 — S. A. PAOLI — 2,648,094
SHRIMP CLEANING IMPLEMENT
Filed Jan. 8, 1951 — 2 Sheets-Sheet 1
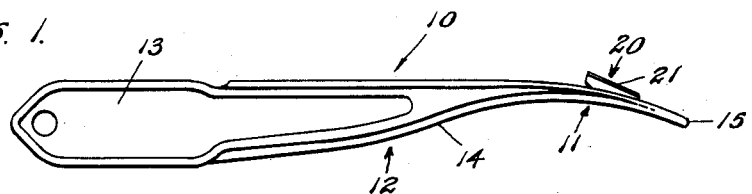
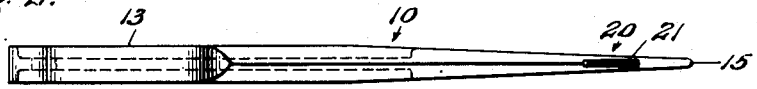
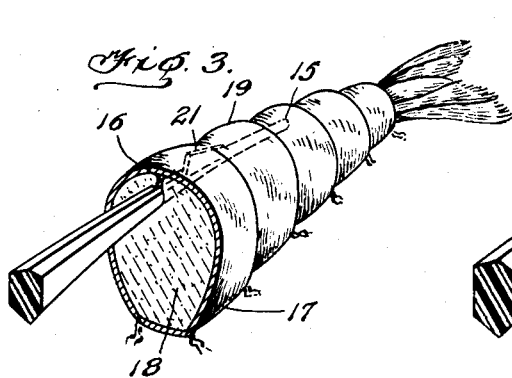
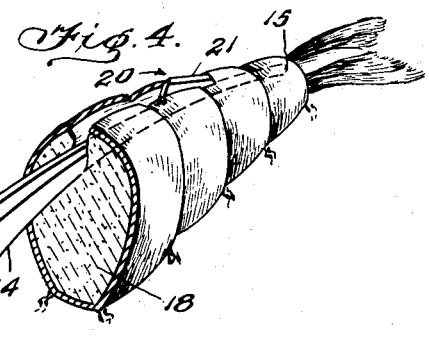
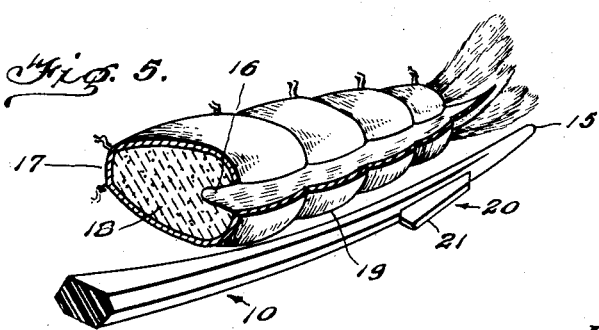
Inventor
Stephen A. Paoli
By McCanna and Morsbach
Attorneys Aug. 11, 1953 — S. A. PAOLI — 2,648,094
SHRIMP CLEANING IMPLEMENT
Filed Jan. 8, 1951 — 2 Sheets-Sheet 2
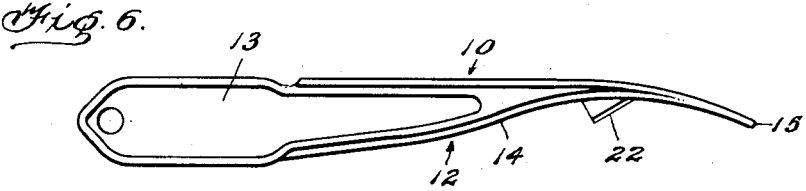
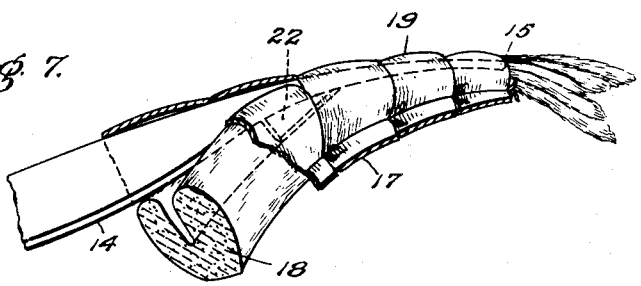
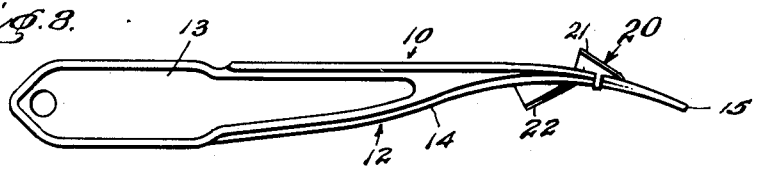
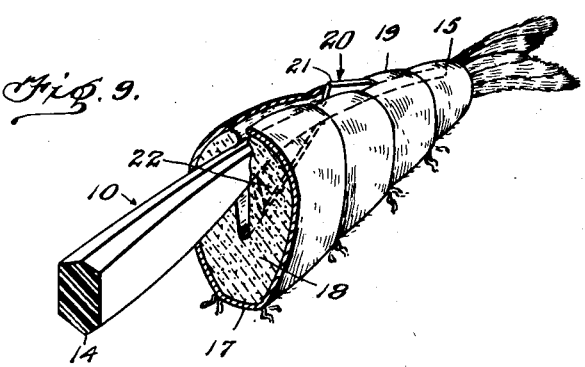
Inventor
Stephen A. Paoli
By McCanna and Morsbach
Attorneys

Patented Aug. 11, 1953

2,648,094

UNITED STATES PATENT OFFICE 2,648,094

SHRIMP CLEANING IMPLEMENT

Stephen A. Paoli, Rockford, Ill.

Application January 8, 1951, Serial No. 204,839

2 Claims. (Cl. 17—7)

This invention relates to a shrimp cleaning implement.

At the present time, in marketing shrimp the usual practice is to de-head the shrimp shortly after they are caught and then to shell the de-headed shrimp, the outer hard shell encasing the edible body of the shrimp. This practice is generally followed whether the shrimp is fresh, canned, or sold as frozen food. Consequently the purchaser of a de-headed shrimp must remove the outer shell from the edible body portion and remove the sand vein from the body of the shrimp before the shrimp can be eaten. Generally, the outer shell or jacket is removed or peeled off the body of the shrimp by means of a knife or the like. After removing the shell the vein is then cut out of the body. This method of cleaning shrimp is a tedious and time consuming task.

An object of this invention is to provide a novel implement for quickly and easily cleaning shrimp.

Another object of this invention is to provide a novel shrimp cleaning implement which severs the back of the shell of the shrimp during cleaning thereof.

A further object of this invention is to provide a novel shrimp cleaning implement which severs the body of the shrimp along the length thereof while removing the shrimp body from the shell.

Further objects and advantages of this invention will become apparent from a study of the following description.

In the drawings:

Figure 1 is a side view of one form of the shrimp cleaning implement according to this invention which includes a top cutting edge associated with the prong portion;

Fig. 2 is a top view of the shrimp cleaner shown in Fig. 1;

Fig. 3 illustrates the shrimp cleaner of Figure 1 inserted into the shrimp during the cleaning thereof;

Figs. 4 and 5 illustrate an alternate method of using the shrimp cleaner of Figure 1, in which the back of the shell is severed by the movement of the implement;

Fig. 6 illustrates another form of the shrimp cleaning implement having a cutting edge associated with the lower face of the prong portion;

Fig. 7 illustrates the use of the implement of Fig. 6 in cleaning shrimp;

Fig. 8 shows another modification of the shrimp cleaning implement in which cutting edges are provided on both the upper face and the lower face of the prong portion, and Fig. 9 illustrates the use of the implement of Fig. 8 in cleaning shrimp.

According to this invention the shrimp cleaning implement 10 includes a prong portion 11, a wedging or camming portion 12 and a handle 13. As shown, the handle 13 forms the rear end of the implement, the prong portion forms the forward end, and the wedging portion forms the central portion joining the handle and prong. The handle may be of any suitable shape that can be conveniently held. As shown in Figs. 1 and 2 a depression may be formed between the upper and lower surfaces of the implement at the handle and wedging portions to facilitate manual gripping of the tool.

The wedging portion 12 is rigidly connected to the handle and projects forwardly thereof. On the top and bottom surfaces of the wedging portion the side edges of the tool are preferably spaced relatively far apart adjacent the handle. These side edges converge at the forward end of the wedging portion where they merge with the sides of the base of the prong. The inclined bottom surface 14 of the wedging portion in effect defines a relatively wide cam surface on the bottom of the implement. The bottom surface of the implement is spaced relatively far apart from the top surface at the handle, and at the wedging portion tapers gradually toward the top surface so that at the forward end of the wedging portion the bottom surface merges smoothly with the bottom of the base of the prong. The prong portion 11 has a generally arcuate shape and extends forwardly of the wedging portion 12, tapering from its base at the wedging portion to its extreme forward tip 15. The cross sectional shape of the prong portion 11 may assume many configurations but should be such that the prong portion may be readily inserted in the sand vein 16 of the shrimp to effect rupture of the passageway at the back of the shrimp body containing the sand vein. The length of the prong portion may vary considerably. In general, however, the prong portion should be of sufficient length so that the prong can move lengthwise of the vein to serve as a guide for the tool, so as to cause the wedging portion 12 to assert a force between the back 19 of the shell and the shrimp body 18 to wedge the body from the shell. Preferably the point 15 of the prong portion is rounded or made blunt.

The handle, wedging portion, and prong portion may be cast as a single unit, or they may be formed as separate parts and then assembled together. Preferably, the top and bottom surfaces of the respective portions merge together to provide an implement having smoothly adjoining surfaces on the prong and wedge portions. Any suitable material, such as metals and synthetic resins, may be used in the casting or molding of this shrimp cleaning implement. Also the shrimp cleaner may be formed of wood or other material, if desired. This implement may also be used in a machine in which the movements of the operator's hands are simulated by mechanical movements.

In Figure 1 the implement is provided with a cutting device 20 formed on the upper surface of the prong portion 11 rearwardly from the point 15 thereof. This cutting device preferably takes the form of a thin blade whose inclined cutting surface 21 tapers upwardly and rearwardly away from the point 15. This blade may be attached to the prong portion by any suitable means. In the case of a molded implement the blade can be molded into the material of the prong portion, or it may be attached to the prong by a metal loop extending around the prong to secure the blade, as shown in Figure 8. In the case of a metal implement the blade 20 may be formed integral with the prong portion, if desired.

One method of using the implement of Figure 1 is illustrated in Fig. 3. The shrimp is normally arcuate in shape. The operator grasps the shrimp in one hand with the bottom of the shrimp facing outwardly. Simultaneously, the operator straightens the body of the shrimp. The operator grasps the shrimp cleaning tool in his other hand and brings the point 15 of the prong into position in alignment with the sand vein of the shrimp.

Next, the operator moves his hands closer together so that the shrimp cleaner and shrimp have been moved relative to each other. When this relative movement takes place the prong 11 is inserted into the vein and is moved lengthwise of the body of the shrimp. The curvature of the prong tends to facilitate the entrance and passage of the prong lengthwise of the sand vein, particularly where the body of the shrimp is not completely straightened. Preferably, the prong should be somewhat flexible in order that it may better follow the sand vein.

As further relative movement between the shrimp and the implement takes place, the wedging portion 12 is forced into the sand vein at the head end of the shrimp. When this occurs the back or side wall 17 of the body of the shrimp adjacent the sand vein is ruptured and the top surface of the shrimp cleaner is against the back 19 of the shell of the shrimp. During this movement the inclined bottom face 14 of the wedging portion 12 forces the forward end of the shrimp body outwardly from between the sides. Upon continued relative movement of the implement and the shrimp the bottom face 14 of the wedging portion moves farther lengthwise of the shrimp body and effects complete removal of the body from the shell. Usually the shell is severed on one side immediately adjacent the feet by the wedging action of the tool, which forces the shrimp body away from the back of the shell.

Where the shrimp being cleaned is relatively large, the blade 20 on the prong severs the meat between the back of the shell and the sand vein when the prong is inserted sufficiently far into the shrimp. This facilitates removal of the shrimp body by the wedging action described.

However, if the blade 20 is large enough to engage the back 19 of the shell when the prong is inserted into the sand vein, the back of the shell will be severed along its length as the blade moves lengthwise of the shrimp. This action is illustrated in Fig. 4. In such operation the wedging action of the tool forcing the shrimp body out of the shell is assisted by the action of the blade 20 severing the back of the shell along its length. In some instances the shrimp body will not be wedged out of the shell, but the action of the blade 20 will leave the shrimp with its back completely severed lengthwise, as shown in Fig. 5.

It will be noted that in either operation of the implement of Figure 1 the shrimp will be effectively deveined by the movement of the prong portion along the sand vein.

Fig. 6 illustrates a bottom cutting blade 22 for the prong portion for cutting the body of the shrimp during the removal thereof from the shell so as to give a "butterfly" appearance to the shrimp body so removed. This lower cutting blade may be attached to the prong in any suitable manner, or formed integral therewith, as desired so as to extend lengthwise along the prong portion disposed along the middle of the bottom face thereof. Blade 22 is formed with a sharp cutting edge which is inclined outwardly from the prong portion in a direction toward the rear thereof. Fig. 7 illustrates the action of this tool during cleaning of the shrimp. The wedging action of the tool takes place in substantially the manner described above in connection with Figs. 1 and 3. The bottom cutting blade severs the body of the shrimp along its length to the depth indicated in Figs. 7 and 9. The shrimp body thereby tends to spread open about the line of severance cut by the bottom blade.

If desired, the implement may be provided with both upper and lower cutting blades on the prong portion, as illustrated in Fig. 8. It will be noted that the lower cutting blade is positioned somewhat rearwardly on the prong portion closer to the wedging portion than is the upper cutting blade. With this implement, the shrimp is cleaned by the wedging action described in connection with Fig. 3, combined with the cutting action of the lower blade to give the "butterfly" appearance, or the implement acts to cut the back of the shell as described in connection with Fig. 5 along with slicing the body of the shrimp lengthwise to achieve the "butterfly" effect.

It will be understood that either cutting blade may be made integral with the prong on the implement, or may be separable therefrom, as desired, without departing from the spirit of the present invention.

I claim:

1. An implement for removing the body of a decapitated shrimp from its shell which comprises a body having a handle at one end, a wedging portion connected to said handle and extending forwardly thereof, and an elongated curved prong portion projecting forwardly of the wedging portion, the wedging portion and the prong portion being formed with top and bottom surfaces, said bottom surface on the wedging portion being spaced relatively far apart from said top surface thereon at a position adjacent the handle, said bottom surface on the wedging portion inclining toward said top surface to a position adjacent the prong portion where said bottom and top surfaces on the wedging portion are relatively closely spaced to define a cam surface on the bottom of the wedging portion, a top cutting blade attached to the prong portion, said top cutting blade being formed with a cutting edge positioned above the top surface on the prong portion and extending lengthwise of the prong portion, inclining toward the top surface of the prong portion in a direction toward the forward end thereof, and a lower cutting blade attached to the prong portion and disposed rearwardly of the top cutting blade, said lower cutting blade being formed with a cutting edge positioned below the bottom surface on the prong portion and extending lengthwise of the prong portion, inclining toward the bottom surface of the prong portion in a direction toward the forward end thereof.

2. An implement for removing the body of a decapitated shrimp from its shell which comprises a body having a handle at one end and a wedging portion connected to said handle and extending forwardly thereof, said body terminating at its other end in an elongated curved prong portion extending forwardly from said wedging portion, said wedging portion being formed with spaced top and bottom surfaces one of which tapers toward the other along the wedging portion from the handle to the prong portion for wedging the body of the shrimp from its shell as the prong is moved lengthwise along the sand vein of the shrimp, said curved prong portion having a convex face for movement along the shrimp at the side of the sand vein adjacent the back of the shell and an opposite concave face for movement along the shrimp at the opposite side of the sand vein, and a cutting blade attached to said prong portion and formed with a cutting edge which extends lengthwise of the prong portion located at the concave side thereof to sever the body of the shrimp at the side of the sand vein remote from the back of the shell as the prong is moved lengthwise of the sand vein to slice the body of the shrimp lengthwise simultaneously with the removal of the shrimp body from the shell.

STEPHEN A. PAOLI.

References Cited in the file of this patent

UNITED STATES PATENTS

| Number | Name | Date |
|---|---|---|
| 1,362,143 | Rohrer | Dec. 14, 1920 |
| 1,788,656 | Brown | Jan. 13, 1931 |
| 2,552,450 | Paoli | May 8, 1951 |
| 2,561,359 | Gorton | July 24, 1951 |